United States Patent [19]
Bsharah et al.

[11] 3,907,745
[45] Sept. 23, 1975

[54] ANTIOXIDANT SYSTEMS CONTAINING CHELATING AGENTS

[75] Inventors: Lewis Bsharah; Walter R. May, both of St. Louis, Mo.

[73] Assignee: Petrolite Corporation, St. Louis, Mo.

[22] Filed: Oct. 26, 1970

[21] Appl. No.: 84,183

[52] U.S. Cl. ........ 260/45.9 AA; 252/51.5; 252/403; 44/73; 99/163; 260/802; 260/814
[51] Int. Cl.² .......................................... C08J 3/20
[58] Field of Search........ 260/45.95, 45.9 AA, 45.7, 260/814, 802, 666.5, 45.85, 45.7 P; 252/403, 51.5; 99/163; 44/73

[56] References Cited
UNITED STATES PATENTS

| | | | |
|---|---|---|---|
| 2,789,912 | 4/1957 | Gleim | 99/163 |
| 2,959,567 | 11/1960 | Pfeifer | 260/45.9 |
| 3,034,879 | 5/1962 | Spacht | 260/45.9 |
| 3,117,931 | 1/1964 | Westlund et al. | 252/51.5 |
| 3,293,297 | 12/1966 | Louvar et al. | 260/45.9 |
| 3,335,108 | 8/1967 | Pines | 260/45.85 |
| 3,527,804 | 9/1970 | Cyba | 252/51.5 |

*Primary Examiner*—V. P. Hoke
*Attorney, Agent, or Firm*—Sidney B. Ring; Hyman F. Glass

[57] ABSTRACT

A synergistic antioxidant system comprising a chelating agent and an antioxidant; and its uses in systems susceptible of oxidation for example in polymers such as rubber, etc. and other systems. The chelating agent or metal deactivator is illustrated by oxyalkylated amines and the antioxidant by those antioxidants conventionally employed in the rubber industry.

4 Claims, No Drawings

ANTIOXIDANT SYSTEMS CONTAINING CHELATING AGENTS

This invention relates to a synergistic antioxidant system comprising a chelating agent or metal deactivator and an antioxidant. This invention also relates to a polymer, such as rubber, etc. containing a chelating-antioxidant system.

There are two general types of antioxidants — namely staining and non-staining type. The non-staining types are particularly useful in white or colored (non-black) rubber, such as in white wall tires. In general, amine-type antioxidants are staining whereas phosphite and phenolic antioxidants are non-staining. However, the phosphite and phenolic antioxidants are not as effective generally as the amine-type antioxidants in regard to antioxidant activity. Therefore, it is desirable to enhance the non-staining antioxidants so that they are equal to or surpass the amine-type without affecting their non-staining properties.

We have found that a chelating agent enhances the function of the antioxidant. We have further found that the use of the chelating agent enhances the antioxidant function of a non-staining antioxidant such as a phosphite, phenolic, etc. anitoxidant without affecting its non-staining properties. In essence, this invention raises the antioxidant function of the non-staining type to that of the amine-type antioxidant without affecting its non-staining properties.

In addition, the chelating agent also enhances the antioxidant properties of the amine-type antioxidant.

Any suitable antioxidant can be employed including the following types:

1. The phenolic type
2. The phenylenediamine type
3. The phosphite ester type.

These types are well known. Typical common specific examples include the following:
2,6-Di-tert-butylcresol
2,2′-Methylenebis(6-tert-butylcresol)
N,N′-Di-sec-butyl-p-phenylenediamine
N-Cyclohexyl-N′-phenyl-p-phenylenediamine
N,N′-Diphenyl-p-phenylenediamine
Tris(nonyl-phenyl)phosphite
Alkylated aryl phosphite
Typical phosphites are illustrated in the following:
Tri(o-octyl-phenyl)phosphite
Tri(p-nonyl-phenyl)phosphite
Tri(p-decyl-phenyl)phosphite
Tri(p-undecyl-phenyl)phosphite
Tri(p-dodecyl-phenyl)phosphite
Tri(p-tridecyl-phenyl)phosphite
Tri(p-tetradecyl-phenyl)phosphite
Tri(p-pentadecyl-phenyl)phosphite
Tri(p-hexadecyl-phenyl)phosphite
Tri(p-heptadecyl-phenyl)phosphite
Tri(p-octadecyl-phenyl)phosphite
Tri(p-eicosyl-phenyl)phosphite
p-Octyl-phenyl di(p-nonyl-phenyl)phosphite
p-Nonyl-phenyl di(p-octyl-phenyl)phosphite
p-Dodecyl-phenyl di(p-octyl-phenyl)phosphite
Tris(di-octyl-phenyl)phosphite
Tri(di-nonyl-phenyl)phosphite
The important phenolic type antioxidants comprise the substituted phenols such as

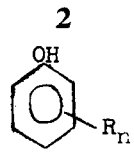

where $n = 2-3$
and bridged substituted phenols such as

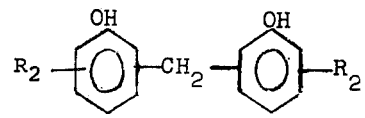

Typical phenylene diamines are illustrated by p-phenylene diamines, which contain alkyl-, isoalkyl-, cycloalkyl-, aryl- etc. radicals in varying combinations attached to the nitrogen atoms. Among the best known products of p-phenylene diamines are N,N′-diphenyl-p-phenylene diamine, N-phenyl-p-phenylene diamine, and N-cyclohexyl-N′-phenyl-p-phenylene diamine.

Other derivatives include for instance N-isopropyl-N′-phenyl-, N-isohexyl-N′-phenyl-, N-isoctyl-N′-phenyl-, N,N′-diisopropyl, N,N′-diisobutyl, N,N′-diisooctyl, and N,N′-di-cyclohexyl p-phenylene diamine.

Both N-substituted p-phenylene diamines and oxyalkylated derivatives thereof are excellent antioxidants.

Antioxidant triaryl phosphites are described in U.S. Pat. No. 2,419,354 such as triphenyl, tri(lower-alkyl-phenyl) phosphites; and U.S. Pat. No. 2,733,226 which describes tri(higher-alkyl-aryl) phosphites. Antioxidant oxyalkylated phosphite esters are described in Ser. No. 727,322 dated May 7, 1968, now abandoned and Ser. No. 808,035 dated Mar. 10, 1969, now abandoned, and antioxidant oxyalkylated arylpolyamines are described in U.S. Pat. Nos. 2,576,458, 2,348,842 which are incorporated herein as if part thereof.

The chelating agent or metal deactivators of this invention comprises oxyalkylated amines, such as polyamines.

The polyamines employed in this invention include those of the following formula:

where $n$ is for example 1–25 or greater, such as 1–10, for example 1–5, but preferably where A is a divalent radical for example straight chained or branched $-(CH_2)_m-$, $-CH_2-CH_2-$,

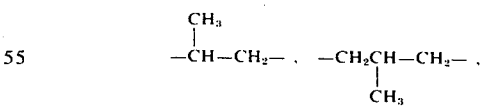

etc. and $m$ is for example 2–10 or greater. These include the following:

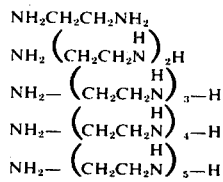

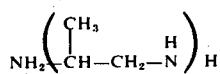

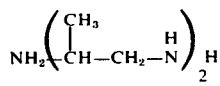

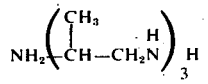

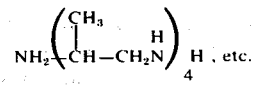

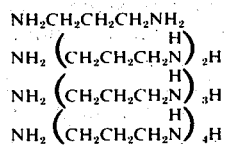

NH$_2$CH$_2$CH$_2$CH$_2$CH$_2$NH$_2$

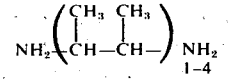

NH$_2$(CH$_2$CH$_2$CH$_2$CH$_2$N)$_{1-4}$H, etc.

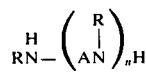

Other examples include the following alkylated polyamines for example of the formula $$\overset{H}{RN}-\left(\overset{R}{\underset{|}{AN}}\right)_n H$$

where the R's are H or a substituted group, such as alkyl, alkenyl, alkinyl, aryl, etc. The preferable type is of the formula $$R-\overset{H}{N}-\left(\overset{H}{\underset{|}{AN}}\right)_n H$$

(R is straight chain or branched)

Examples include the following:

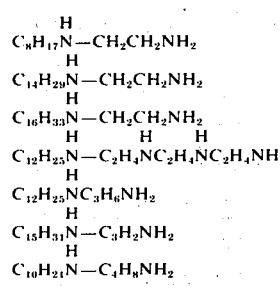

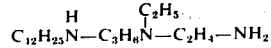

Other suitable amines are exemplified by:
CH$_2$—OCH$_2$CH$_2$CH$_2$NH$_2$
CH$_2$—OCH$_2$CH$_2$CH$_2$NH$_2$ Also included are oxyalkylated arylamines such as o-phenylene diamine

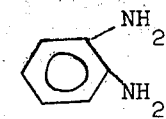

aryl tetramine such as

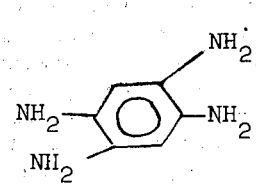

, etc.

Provided the amine contains at least two nitrogens in chelating juxtaposition, the oxyalkylated amine can contain other functional groups such as carboxylic, hydroxy, etc. groups for example

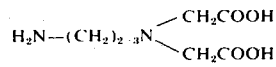

Ammonia may also be oxyalkylated to yield for example

N[(CH$_2$)$_{2-3}$OH]$_3$

Thus, the general term employed herein is "chelating oxyalkylated amines".

The alkylene oxides employed herein are 1,2-alkylene oxides of the formula

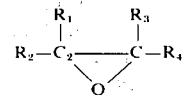

where the R's are selected from the group H, aliphatic, cycloaliphatic, aryl, etc. group, for example, ethylene oxide, propylene oxide, butylene oxide, amylene oxide, octylene oxide, styrene oxide, methyl styrene oxide, cyclohexene oxide (where R$_1$ and R$_3$ are joined to make a ring) etc.; mixtures or alternate additions of oxides can also be employed such as both ethylene and propylene, etc.

Oxyalkylation is conventional and may be carried out with or without a catalyst. Where a catalyst is employed it is a basic catalyst such as NaOH, KOH, etc. in catalytic amounts such as from about 1 to 20 mole percent of catalyst based on phenylenediamine, for example, from about 2 to 7 but preferably from about 3 to 5 mole percent.

The oxyalkylation in accordance with this invention may be carried out over a wide temperature range and pressure. Usually it will be carried out at a temperature from about 80°C. up to about 180°C., preferably within the range of from about 130°C., to about 160°C., and more preferably from about 140°C. to about 150°C. Usually, the oxyalkylation will be carried out at autogenous pressure, but superatmospheric pressures up to several hundred pounds may be used if desired, and in the same way, subatmospheric pressures may also be used.

Oxyalkylation time may vary from an hour or less to as long as a week or longer. In general, the higher the temperature (at least up to the range of near 150°C.), and the greater the catalyst concentration, the faster the oxyalkylation, and therefore, the shorter the reaction time. We prefer to carry out the oxyalkylation using conditions such that relatively good yields can be obtained in 4–24 hours.

The weight ratio of chelating agent to antioxidant can vary widely depending on the system, the chelating agent, the antioxidant, etc. In general the ratio of chelating agent to antioxidant is from about 0.1 to 1.75 such as from about 0.25 to 1.5 for example from about 0.5 to 1.35, but preferably about 1 ±0.25.

The antioxidant is added to the rubber mixtures in amounts customarily applied in the art. In general, the antioxidant is added in a proportion of 0.1–5% but preferably 0.25–3%, by weight of rubber. In specific cases it may be advantageous to add larger quantities of the mixture.

Herein described synergistic mixtures of chelating agents and antioxidants may be used for natural rubber and synthetic rubber-like polymers obtained for instance from conjugated diolefins or copolymers of conjugated diolefins with polymerizable vinyl compounds such as styrene, acrylonitrile, acrylates and methacrylates and similar compounds.

The following are examples of typical commercial rubber formulations:

TYPICAL FORMULATION A

| Smoked Natural Rubber Sheets | 100.00 | parts/hundred rubber |
|---|---|---|
| Santocene* | .6 | |
| Sulfur | 2.5 | |
| Chenets' 102R (ZnO) | 4.0 | |
| Stearic acid | 1.0 | |
| Titanox | 5.0 | |
| 4200 Clay Hallcolite | 25.0 | |
| OP (Plasticizer) | 4.0 | |
| Antioxidant | 1.0 | |
| Chelating Agent | 1.0 | |

* N-cyclohexyl-2-benzothiazole sulfenamide

TYPICAL FORMULATION B

| SBR 1500 | 100.00 | parts/hundred SBR |
|---|---|---|
| Zinc Oxide | 5.0 | |
| Stearic Acid | 1.5 | |
| Sulfur | 2.0 | |
| EPC Black | 40.0 | |
| Benzothiozyl Disulfide | 3.0 | |
| Antioxidant | 0.5 | |
| Chelating Agent | 0.5 | |

The following examples are presented to illustrate the superiority of the chelating systems of this invention:

EXAMPLE 1

One mole of ethylenediamine was placed in an autoclave and heated to boiling. Four moles of ethylene oxide were added over a period of about 8 hours. Heating and stirring were continued and within 24 hours of the start of addition of ethylene oxide, the pressure in the autoclave indicated that the reaction was complete. (EDA + 4M EtO)

GLC (Gas-Liquid Chromatograph) analysis of the product indicated a 95% yield.

EXAMPLE 2

Example 1 was repeated in which 4 moles of propylene oxide were reacted with ethylene diamine. The GLC analysis indicated a 95% yield. (EDA + 4M PrO)

EXAMPLE 3

Example 1 was repeated in which 4 moles of butylene oxide were reacted with one mole of ethylene diamine. The GLC analysis again indicated a yield in excess of 95%. (EDA + 4M BuO)

EXAMPLE 4

One mole of ethylene diamine was placed in a reaction vessel and heated to reflux temperature. Two moles of butylene oxide were added over a 4-hour period. The heating and stirring were continued for another 4 hours. At that time, 2 moles of chloroacetic acid were added dropwise over a 4-hour period. The apparatus was flushed continuously with dry nitrogen to remove by-product HCl. When acid evaluation ceased, the reaction was stopped. Analysis of the NMR spectra indicated that the desired product was obtained.

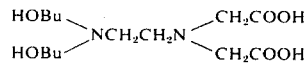

EXAMPLE 5

Example 1 was repeated in which four moles of ethylene oxide were reacted with 1 mole of o-phenylene diamine. Analysis of the NMR spectra of the product indicated that the desired product was attained. (O-PD + 4M EtO)

EXAMPLE 6

Example 1 was repeated in which four moles of propylene oxide were reacted with 1 mole of o-phenylene diamine. Analysis of the NMR spectra of the product indicated that the desired product was attained. (O-PD + 4M PrO)

The antioxidant activity of the metal deactivation desired above, alone and in combination with various antioxidants and metal oxidation catalysts, was evaluated by a high-pressure differential thermal analysis (DTA) technique. In this method, Type 1500 styrene-butadiene latex was coagulated, dried, and dissolved in toluene. To aliquots of the toluene-rubber solution were added 0.5 phr (parts/hundred parts of SBR) antioxidant, 0.5 phr metal deactivator and, when added, 0.1 phr of metal naphthenates. The components were thoroughly mixed and dried. A DTA thermogram was made for the sample under 300 p.s.i. oxygen. The temperature of the maximum position of the peak correlates at the 95% confidence level or higher with physical test data obtained in more conventional test methods. The DTA test method is described in detail in the following publications: *I & E C Product Research and Development*, Vol. 7, page 57, 1968, and Vol. 8, pg. 185 (1969).

TABLE I

| Anti-oxidant* | Metal Deactivator** | | | | | |
|---|---|---|---|---|---|---|
| | None | G | H | J | K | L |
| None | 140 | 170 | 162 | 156 | | |
| A | 203 | 195 | 197 | 220(+) | 211 | |
| B | 212 | 223 | 217 | 213 | 199 | |
| C | 204 | 222 | 205 | 220(+) | 212 | |
| D | 182 | | | 194 | 193 | |
| E | | | | 167 | 183 | |
| F | 167 | 178 | 175 | 177 | 190 | 178 |
| Cerium | | | | | | |
| None | 109 | 145 | 172 | 175 | | |
| A | 165 | 190 | 178 | 190 | 153 | |
| B | 195 | 203 | 198 | 203 | | |
| C | 163 | 206 | 198 | 217 | | |
| D | 177 | | | 162 | 157 | |
| E | 138 | | | 115 | 105 | |
| F | 130 | | | | | 173 |
| Copper | | | | | | |
| None | 118 | 165 | 145 | 122 | | |
| A | 145 | 192 | 177 | 192 | 192 | |
| C | 162 | 195 | 164 | 197 | | |
| D | 158 | | | 154 | 180 | |
| E | 132 | | | 123 | 132 | |
| F | 163 | | | | | 137 |
| Iron | | | | | | |
| None | 119 | 165 | 162 | 163 | | |
| A | 162 | 183 | 167 | 181 | 169 | |
| B | 184 | 182 | 158 | 187 | 158 | |
| C | 167 | 180 | 163 | 205 | 175 | |
| D | 167 | | | 163 | 160 | |
| E | 138 | | | 143 | 148 | |
| F | 153 | | | | | 145 |
| Manganese | | | | | | |
| None | 120 | 150 | 182 | 182 | | |
| A | 180 | 172 | 176 | 173 | 158 | |
| B | 178 | 190 | 188 | 192 | | |
| C | 147 | 192 | 168 | 200 | | |
| D | 177 | | | 144 | 140 | |
| E | 122 | | | 103 | 132 | |
| F | 128 | | | 135 | | 155 |

Antioxidants*
A — Reaction product of N-phenyl-p-phenylene diamine with three moles ethylene-propylene oxide mixed.
B — N-phenyl-N'-propyl-p-phenylene diamine
C — N-phenyl-N'-cyclohexyl-p-phenylene diamine
D — 2,2'-Methylene bis(1,4-t-butyl-p-cresol) (non-staining)
E — Tris(nonyl-phenyl)phosphite (non-staining)
F — 2,2'-methylene-bis (4,6-di-t-butyl phenol) (non-staining)
G — is N,N,N',N'-tetrakis (2-hydroxy ethyl)-o-phenylene diamine
H — is N,N,N'N -tetrakis (2-hydroxy propyl)-o-phenylene diamine
J — is N,N,N',N'-tetrakis (2-hydroxy ethyl)-ethylene diamine
K — Reaction product of ethylene diamine with two moles of ethylene oxide.
L — N,N,N',N -tetrakis (2-hydroxy propyl)-ethylene diamine.

The DTA peak positions for a variety of metal deactivator-antioxidant-metal combinations are given in the above TABLE I. The higher the peak position, the better the antioxidant. As can be seen, the metal deactivators were relatively poor antioxidants by themselves, but in almost every case, they increased the activity of the antioxidant when used in combination with an antioxidant.

In the presence of a metal, the metal deactivators show some activity which may be attributed to deactivating the metal as a catalyst. In most instances in which metal-antioxidant-metal deactivator combinations were tested, the inclusion of a metal deactivator resulted in an improvement over the metal-antioxidant combination.

These results also indicate an unexpected increase in the activity of phenolic and phosphite non-staining antioxidants in combination with the metal deactivators while maintaining their non-staining properties.

Other systems which are subject to oxidation deterioration on storage in which the compositions of the present invention can be employed are the following:

1. Polymers such as polyolefins, polyethylene, polypropylene, copolymers of ethylene and propylene, etc
2. Lubricating oils and greases, both synthetic and natural such as silicones, polyesters, etc., lubricating oil, marine oil, transformer oil, turbine oil, etc.
3. Fats and oils, aniamals, vegetable and mineral.
4. Fuels such as motor, jet, diesel, etc. fuels.
5. Miscellaneous products such as waxes, resins, etc.

Although the invention has been described with reference to preferred embodiments thereof, it is understood that the description is by way of illustration only. Accordingly it is contemplated that modifications and variations can be made by those skilled in the art in light of my description without departing from the spirit of the invention.

Having thus described our invention what we claim as new and desire to obtain by Letters Patent is:

1. An antioxidant system comprising (1) an antioxidant selected from the group consisting of a staining antioxidant and a non-staining antioxidant and (2) an oxyalkylated o-phenylene-diamine as a chelating agent, said oxyalkylated o-phenylene-diamine being o-phenylene-diamine oxyalkylated with (i) ethylene oxide, (ii) propylene oxide or (iii) ethylene oxide and propylene oxide.

2. An organic system subject to oxidation deterioration containing a stabilizing amount of the composition of claim 1.

3. The organic system of claim 2 wherein said system is rubber.

4. Rubber subject to oxidation deterioration containing a stabilizing amount of an antioxidant system comprising (1) an antioxidant selected from the group consisting of a staining antioxidant and a non-staining antioxidant and (2) an oxyalkylated polyalkylene amine as a chelating agent, said oxyalkylated polyalkylene amine being ethylene diamine oxyalkylated with (i) ethylene oxide, (ii) propylene oxide or (iii) ethylene oxide and propylene oxide.

* * * * *